Figure 2:
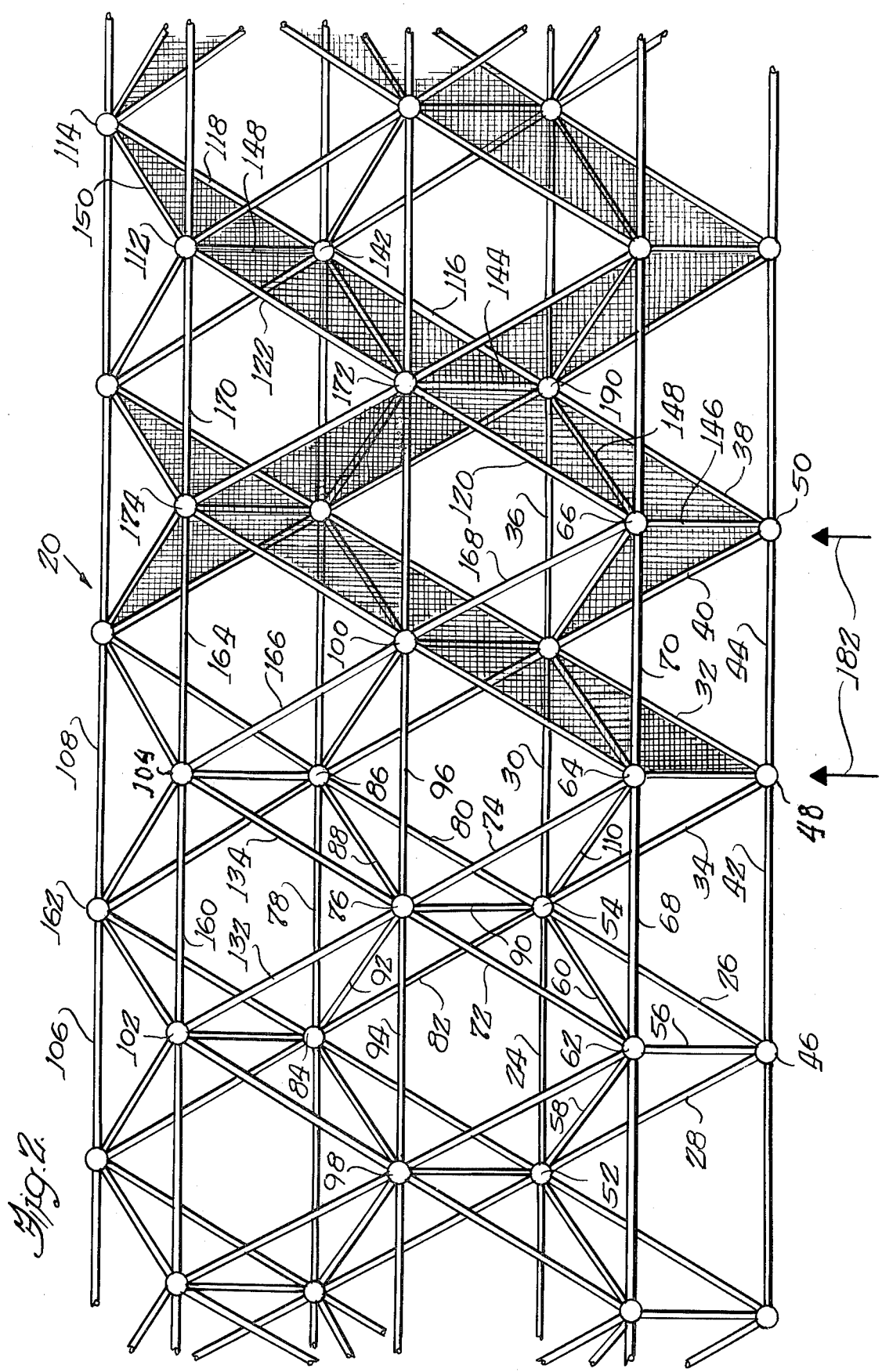

United States Patent [19]

Mansen

[11] 4,118,937
[45] Oct. 10, 1978

[54] METHOD AND MEANS FOR BEACH RESTORATION

[76] Inventor: David Joel Mansen, 1312 Livingston St., Evanston, Ill. 60201

[21] Appl. No.: 821,438

[22] Filed: Aug. 3, 1977

[51] Int. Cl.$^2$ .............................................. E02B 3/04
[52] U.S. Cl. ........................................ 405/30; 405/16
[58] Field of Search ............................... 61/3, 4, 37, 2

[56] References Cited

U.S. PATENT DOCUMENTS

| 1,389,513 | 8/1921 | Kellner | 61/3 |
|---|---|---|---|
| 1,716,509 | 6/1929 | Smith | 61/3 |
| 2,097,342 | 10/1937 | Rehfeld | 61/3 X |
| 2,803,113 | 8/1957 | Hoad | 61/4 |
| 2,835,112 | 5/1958 | Monnet | 61/3 |
| 3,386,250 | 6/1968 | Katayama | 61/3 |

*Primary Examiner*—Mervin Stein
*Assistant Examiner*—David H. Corbin
*Attorney, Agent, or Firm*—Harry Mansen

[57] ABSTRACT

A method and means are provided for stopping erosion of beach areas and restoring the same by wave and wind activated formation of new dunes, by erecting on the beach area an elongate frame and screen structure of lightweight materials and anchoring said structure to the ground. The frame members are arranged and interconnected to form a plurality of tetrahedral units which, in turn, are assembled so as to present to incoming waves a zigzag-shaped wall composed of screen sections inclined upwards and landwards, whereby to subject the structure to forces tending to press it down towards the ground and thus to retain it in position even before it is buried in accumulating sand masses. The invention includes special means for interconnecting the frame members and for anchoring the structure.

6 Claims, 7 Drawing Figures

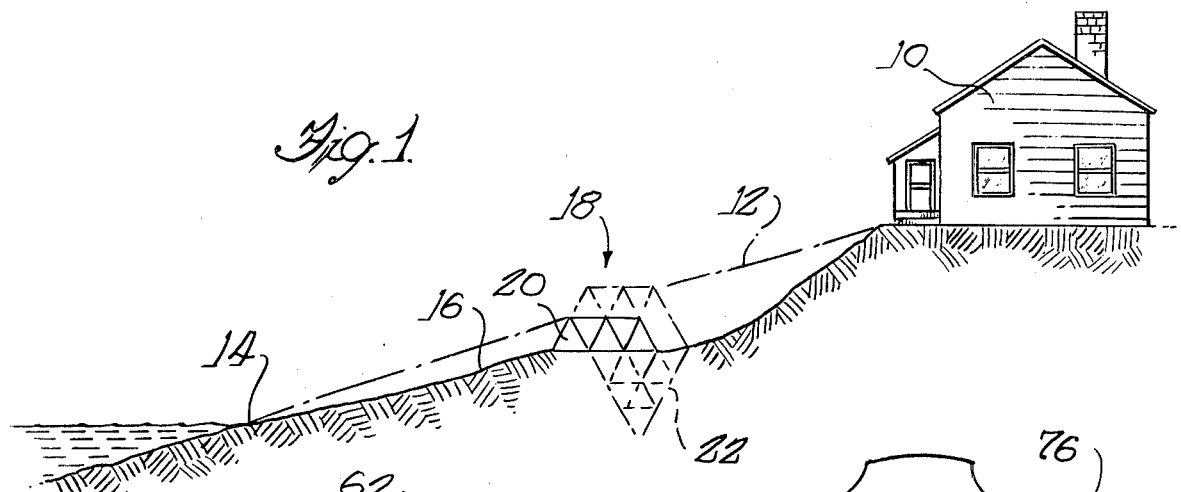
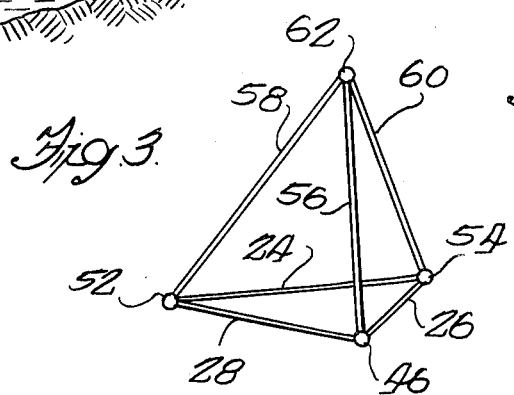
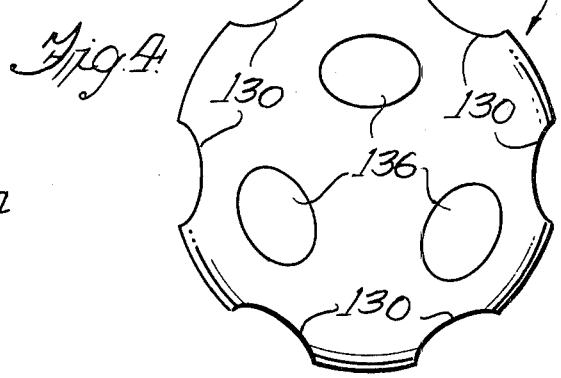
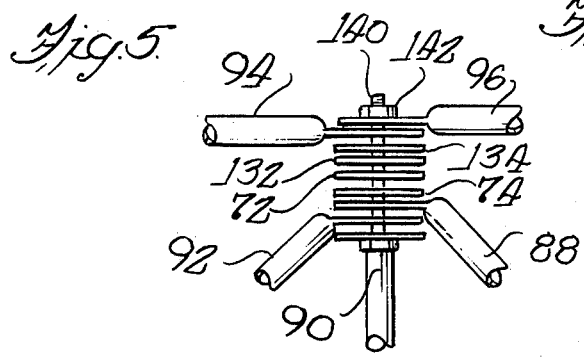
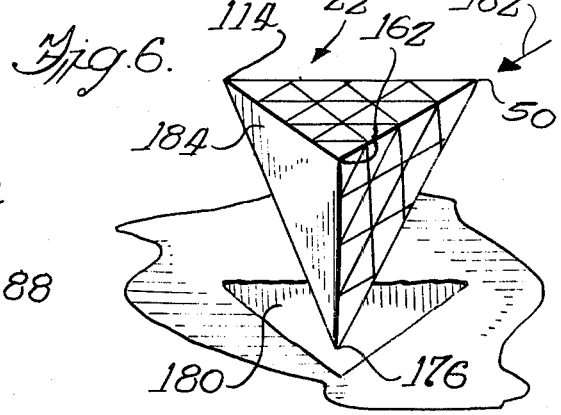
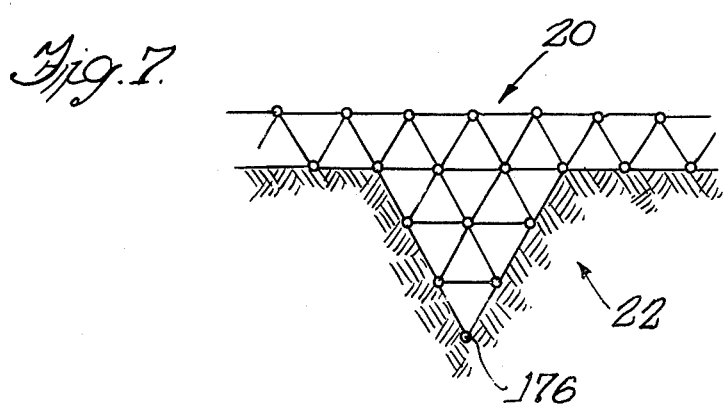

METHOD AND MEANS FOR BEACH RESTORATION

The invention relates to a novel method and means for protection and/or restoration of shores and beaches along oceans, lakes and rivers, where waves and floodings tend to cause erosion and in many cases danger and damage to the shore area itself and to installatons on and adjacent thereto, such as apartment buildings, summer homes, playgrounds, parks, parking lots, streets and roads. For protection of such shore areas it has been common practice to build breakwaters, usually of concrete or rock ridges, to prevent erosion of the areas located landwards thereof. Such breakwaters are expensive to erect and in many cases undesirable for various practical and esthetic reasons.

The present invention overcomes said disadvantages and drawbacks by the use of a novel breakwater structure, which is inexpensive, easy to erect and efficient, and which in addition promotes the formation of new dunes which ultimately cover the structure completely, thus restoring the "natural" appearance of the shore area and protecting the breakwater itself from further erosive influences. The breakwater comprises an elongate truss of lightweight tubings extending substantially along the shoreline and resting on the ground, with anchoring means of similar lightweight construction projecting downwardly into the ground to prevent overturning or displacement of the truss due to wind and wave activities, before it has been covered with gradually accumulating sand. The truss and the anchoring means are preferably in the form of a framework composed of a plurality of aluminum or aluminum alloy tubings of equal length and diameter which are assembled according to a distinct and universal pattern to be described below. A number of relatively fine mesh screens are mounted in certain positions within the truss for a purpose which will become evident, as the description proceeds.

In the accompanying drawings a preferred embodiment of the invention is shown, and in said drawings FIG. 1 is a cross-sectional view, generally perpendicular to the shoreline, of a building separated from said shoreline by a beach area with a device according to the invention thereon, FIG. 2 is an enlarged view of the truss from above, with the location of the screens indicated by cross-hatching, FIG. 3 is a perspective view of a tetrahedral assembly of six struts forming one unit of many, of which the truss and anchoring means may be considered to be composed, FIG. 4 is a top (or bottom) view of generally spherical elements used for joining the struts, FIG. 5 is a side view of an alternative joint between the struts, FIG. 6 is a perspective view of one of the anchoring means, shown in position to be lowered into the hole in the ground where it is to be located, and FIG. 7 shows diagrammatically the anchoring means assembled with the truss and in position in the hole in the ground, before said hole has been filled with sand.

FIG. 1 illustrates diagrammatically the typical conditions at a lakefront summer home, where at the time the building 10 was erected a beach area 12 separated the building 10 from the normal waterline 14. Through storms and accompanying wave action the beach surface has gradually been eroded, until it has assumed a profile approximately as indicated by line 16. On a portion of this beach area 16, which is, or is made, reasonably level, the breakwater structure 18 according to the invention is the erected with the truss 20 extending generally parallel with the waterline 14 and with the anchoring means 22 buried in the ground at intervals along the truss 20, which may consist of a single layer of tetrahedral frame units, as indicated in full lines, or have additional such layers added thereto, as indicated in dotted lines, depending upon the actual shape of the eroded beach surface and the shape desired to be achieved.

The truss 20, a section of which is shown on a larger scale in FIG. 2, commprises a base network of struts of equal length joined at the ends to form a pattern of triangular bases arranged side by side. Thus, for example, starting from the waterfront side of the truss, the struts 24, 26, 28 form a first triangular base, struts 30, 32, 34 form a second triangular base, in which strut 30 is aligned with strut 24, and struts 36, 38, 40 form a third triangular base having strut 36 aligned with struts 24 and 30. Aligned struts 42, 44 interconnect the tops 46, 48, 50 of said three triangular bases. From the three corners 46, 52, 54 of the first triangular base three struts 56, 58, 60 extend upwardly to form together with struts 24, 26, 28 a pyramid, or a tetrahedral figure, having its vertex at 62 (compare FIG. 3). Similar conditions prevail in respect of the second and third triangular bases with vertexes at 64 and 66, respectively. Vertexes 62, 64, 66 are interconnected by inter-aligned struts 68, 70 which accordingly are parallel with base frame struts 42 and 44, respectively, and located at a level above that of said first, second and third triangular bases. On said higher level, struts 72, 74 extend from vertexes 62 and 64, respectively, to a junction point 76 which constitutes the vertex of a pyramid, or tetrahedral figure, having for its base the triangular base formed by struts 78, 80, 82 and connected with the corners 54, 84, 86 of said triangular base by inclined struts 88, 90, 92. Since vertex 76 is connected by inter-aligned struts 94, 96 to vertexes 98, 100, etc., of other triangular bases and on the same higher level, it is obvious that a second row of identical pyramids, or tetrahedral figures, is formed alongside the row of pyramids formed on the aforementioned first, second and third triangular bases, the pyramids of said second row being offset by half a strut length along the truss in relation to the pyramids of the first row.

Obviously, in the embodiment shown, a third row of identical pyramids having their respective vertexes 102, 104, etc., extends along the truss in identical arrangement and connection with the second row, and in the embodiment comprising three adjacent rows of such pyramids the aligned base struts 106, 108, etc. constitute the back edge of the truss, as seen from the waterfront. It is obvious also, that the vertexes, such as 62, 76, 98, on the second level of the truss may serve as base supports for a row of identical pyramids (not shown) having their vertexes on a third level above the ground. Incidentally, tetrahedrons such as 68, 72, 74, 60, 90, 110 which alternate with the previously described pyramids in each row, may be described as "inverted pyramids", since they have their triangular "bases" on the level next above the level, where their "vertexes" are disposed.

The means for joining the struts together may all be identical, and an example thereof is shown in FIG. 4 which represents junction 76 in FIG. 2. It consists of a lightweight spherical ball provided with six holes 130 having their central axes in a common plane which is the case of junction 76 is horizontal. The holes 130 are evenly distributed around the circumference of the ball 76 and each receives the end portion of a lightweight strut which is welded or brazed in place. In the case of ball 76 said six horizontal struts are 72, 74, 94, 96, 132 and 134 and in addition ball 76 is provided on its bottom side with three holes (not shown) adapted to receive the upper end portions of the inclined struts 88, 90, 92, while on its top side it has the three holes 136 which in FIG. 2 are unoccupied but in position to receive the lower end portions of inclined struts (not shown) for support of a third layer of struts on the second level above the ground. Accordingly, all the balls are identical and each provided with holes arranged and adapted to receive a maximum of 12 struts.

An alternative construction of a joint, such as at 76, between nine struts is shown diagrammatically in FIG. 5. As indicated, the end portions of the struts have been flattened out and, in the case of the inclined struts 88, 90, 92, bent, whereupon the flattened portions are placed on top of each other (in FIG. 5 shown separated from each other for clarity of illustration) and clamped together by means of a bolt 140 inserted through previously drilled holes in the flattened strut portions and retained by a nut 142 on its projecting end.

In the truss 20, as described above and shown in detail in FIG. 2, a plurality of relatively fine mesh screens are secured to certain of the struts to cover selected areas enclosed by said struts. Some of said screen-covered areas have been indicated by cross-hatching in the right-hand portion of FIG. 2 only, in order to avoid a cluttered appearance of said FIG. 2 due to the numerous reference letters in the lefthand portion thereof. It is noted that in all said selected areas, as e.g. the area 50, 66, 112, 114, the screens extend from aligned struts 38, 116, 118 on the ground level to aligned struts 120, 122 on the second level, which means that all the screens covering such selected areas are inclined upwardly and rearwardly, as viewed from the waterfront side. Accordingly, waves impinging upon the screens tend to force the screens, and thereby the entire truss 20, rearwardly and downwardly toward the ground, thus — together with the anchoring means 22 — counteracting wave and wind forces tending to lift the front edge portion of the lightweight truss up from the ground and dislocating it from its designated location. It is obvious that correspondingly located screens (not shown) between the second level of the truss and a third level thereof form aligned extensions upwardly and rearwardly of the screens described above.

Since the screens shown in FIG. 2 cross each other at various places, such as along the inclined strut 144, it is necessary to cut them in sections, before they are mounted in the truss. Said sections are then attached to appropriately located struts by welding or brazing. For example, one screen section in the form of an equilateral rhombus may cover the area enclosed by the struts 144, 38, 146 and 120 and have its edges secured to said four struts and, if found desirable, it may also be secured to strut 148 which is obviously located in the same plane. An identical screen section may be secured to struts 144, 122, 148 and 116, and so forth. In fact, in the embodiment of FIG. 2 all the screen sections are identical except those in the third (landward) row of the truss, where each screen section, such as the one enclosed by struts 118, 148 and 150, is in the form of half an equilateral rhombus. It may be remarked, that in some installations it has been found that a satisfactory effect of the breakwater is achieved with considerably less total screen area. In such cases all the screen sections may be of this lastmentioned form and all the "top" sections, such as the one bordered by struts 120, 144, 148, omitted.

The anchoring means 22 (FIGS. 1, 6 and 7) are preferably structures of basically the same kind as the truss 20 and attached thereto at intervals of approximately 12 – 20 feet. For example, a truss (FIGS. 1 and 2) may be placed upside down on the beach, so that it rests on the struts which in FIG. 2 form the aforementioned second level of the truss, such as struts 68, 72, 74, 94, 96, 132, 134, 160, etc. On the ground level frame structure then facing upwardly a pyramid comprising an assembly of tetrahedral units of the kind described in then erected having for its base, e.g., the triangular frame 50, 162, 114 (FIG. 2). Obviously, the next higher layer of identical tetrahedrons (rightside up and inverted) would have for its base the struts 164, 170, 166, 122, 168 and 120 which together form the triangular frame 66, 104, 112.

These inclined struts (not shown in FIG. 2) extend upwardly from the junctions 66, 100, 172 to form a vertex (not shown) on the next higher level, and the same is true with regard to the other two triangles 104, 174, 100 and 174, 112, 172 on this second level. Said three vertexes on the third level are interconnected by struts (not shown in FIG. 2) which together form the base of a pyramid having its vertex on a fourth level, said last-mentioned vertex 176 (FIGS. 6 and 7) forming the top point of the pyramid assembly having the triangle 50, 162, 114 for its base.

An anchoring means 22 of this kind is shown diagrammatically on a smaller scale in FIG. 6 in a position ready to be lowered into its hole 180 in the beach ground. The anchor may be secured to the truss as described above at this time, although said truss is omitted from FIG. 6. The arrow 182 corresponds to arrows 182 in FIG. 2, and it is obvious, therefore, that the landwards side of the anchor is at 184 and is covered by a thin solid sheet of lightweight which is secured (by welding or brazing) to the struts enclosing the triangle 114, 162, 176 and, optionally, to other struts in the same plane. The main function of the sheet 184 is to counteract any tendency of the truss to be displaced in a landwards direction under the influence of wind and/or impinging waves.

FIG. 7, showing a diagrammtic side view of the anchor 22 and the attached truss 20 in position on the beach, is self-explanatory. It should be noted, that although the anchoring means 22 has been described above as attached to the underside of the truss 20 in such a position that the triangular area 50, 114, 162 coincides with the similarly marked area of the truss, i.e. with the portion of the anchor rearwardly of said area projecting rearwardly beyond the landwards side of the truss, it has frequently been found advantageous to secure the anchor 22 to the truss in a position, where a still larger portion of the anchor projects beyond the truss, i.e. the seawardly facing junction 50 of the anchor may be secured, for example, to junction 190 of the truss, or even to junction 192 thereof, thus placing the major portion of the anchor landwardly of the truss. The beneficial effect of such an arrangement is to increasingly counteract any tendency of wind and wave forces acting on the lightweight truss from the waterfront side to lift the truss and tilt it over, before the truss has been buried in sand.

In operation, the truss functions similarly to an ordinary solid breakwater, or seawall e.g. of concrete, but with the difference that the screens absorb the energy of the waves less abruptly and allow a considerable portion of the wave water to continue through, over and beyond the truss. However, a portion of the sand carried by the waves is stopped by the screens and deposited within the area of the truss, and the force of the waves is diminished to a certain extent, until it gradually is spent completely in the area within and/or beyond the truss, causing another portion of the wave-carried sand to settle down. The more slowly receding water passes through the screens from behind, and any sand still carrier thereby that not passes through the screens, is deposited behind the same. Repeated wave action of this kind gradually causes the formation of a new dune, which eventually completely buries the truss. The process may take months or merely a few weeks depending upon the frequency and violence of the wave action. Wind-borne sand is, of course, also partially stopped and deposited by the screens, and when the new dune has been building up to the top level of the truss, wind and wave borne sand continues to be deposited and retained landwards of the dune, until the original beach level 12 (FIG. 1) is again approximately restored. As the new formation settles, vegetation may begin to cover at least parts thereof, and it has been noted that as this development progresses, such vegetation is often greatly stabilized by roots clinging to and winding around the buried screens and struts of the truss. In any case, erosion of the restored beach is permanently stopped and danger to shore installations due to erosion is eliminated.

The preferred construction of the strut and screen assembly described above and shown in the drawings may, of course, be modified to some extent without departing from the scope of the attached claims, as long as the breakwater and dune-forming characteristics thereof are retained. It is noted also, that, if found desirable, the original truss 20 may be enlarged before or after installation, as indicated by dotted lines in FIG. 1.

The tubings used for struts in the embodiment described above are manufactured by the Reynolds Aluminum Company under the designation "6061T6". Each strut is 18 inches long and ¾ inch in diameter with a wall thickness of 0.049 inches.

What I claim is:

1. An elongate truss structure for use as a breakwater and for wave and wind activated formation of a new dune on an eroded beach, said structure having a front side and a rear side and comprising
   a. at least two parallel and laterally connected rows of interconnected frame units, each consisting of six lightweight tubular struts of substantially equal lengths which are joined together three and three at their ends to form an opensided tetrahedron with a substantially horizontal triangular base and a vertex thereabove,
   b. means connecting a base strut in one of said tetrahedrons of each row with a substantially aligned base strut in a neighboring tetrahedron of the same row so as to place the top joints of each triangular base in said rows forwardly of its base strut,
   c. means connecting each of said top joints in the rear-wardly row of tetrahedrons with one of the joints between said aligned base struts of the front row of tetrahedrons to thus offset the rearwardly row of tetrahedrons longitudinally by substantially one half strut length in relation to the front row of tetrahedrons,
   d. lightweight tubular struts interconnecting the vertexes of said tetrahedrons in the front and rearwardly rows separately, and
   e. screens attached to said struts and at least partly covering the inclined sides of the tetrahedrons extending rearwardly from said top joints of the triangular bases.

2. The elongate truss structure according to claim 1, including lightweight tubular struts interconnecting said top joints of the triangular bases in said front row of tetrahedrons.

3. The elongate truss structure according to claim 1, in which the struts connecting the vertex of a tetrahedron in said front row with the vertexes of two tetrahedrons in said rearwardly row, together with the strut interconnecting said two rearwardly vertexes, serve as the triangular base for a tetrahedron in a higher level row of tetrahedrons arranged and connected similarly to the tetrahedrons on the lower level, whereby the rearwardly inclined front vertex struts of the higher level row of tetrahedrons form direct continuations of the corresponding vertex struts of the lower level tetrahedrons.

4. The elongate truss structure according to claim 1, in which the strut connecting means comprises a substantially ball-shaped member provided with 12 surface openings, the central axes of which intersect each other at the center of the ball-shaped member, each of said openings being of a size and shape corresponding to the cross-section of one of said struts, six of said openings being equally spaced in a central horizontal zone around the ball-shaped member, while three openings are equally spaced in each of an upper and a lower parallel zone and have their central axes inclined outwardly by 60° to the horizontal plane, each of the openings in said upper zone being circumferentially offset by 30° from the closest openings in the central zone, and each of the openings in said lower zone being circumferentially offset by 60° in relation to the openings in the upper zone.

5. The elongate truss structure according to claim 1, in which the strut connecting means at each joint comprises a bolt and nut assembly clamping together end portions of the struts, which are flattened and properly bent to be placed in parallel on top of each other and provided with aligned holes for the bolt.

6. The elongate truss structure according to claim 1, including a plurality of anchoring means secured to said truss at intervals along its length and each composed of tetrahedral units as described assembled in an upside down position to form an inverted pyramid for burying in the ground, the landward side of said inverted pyramid being covered with a metal sheet attached thereto.

* * * * *